United States Patent [19]

Wunsch

[11] Patent Number: 4,640,590
[45] Date of Patent: Feb. 3, 1987

[54] APPARATUS PROVIDING RAPID ADJUSTMENT OF A MIRROR

[75] Inventor: Erich Wunsch, Bad Liebenzell, Fed. Rep. of Germany

[73] Assignee: Efrudec GmbH, Fed. Rep. of Germany

[21] Appl. No.: 747,359

[22] Filed: Jun. 21, 1985

[30] Foreign Application Priority Data

Jun. 26, 1984 [DE] Fed. Rep. of Germany ....... 3423520

[51] Int. Cl.⁴ .......................... G02B 7/18; G02B 5/08
[52] U.S. Cl. ................................... 350/632; 248/479; 248/487; 350/634; 350/636; 350/637
[58] Field of Search ................. 350/631–637; 248/466, 476, 479, 480, 485–487

[56] References Cited

U.S. PATENT DOCUMENTS

| | | | |
|---|---|---|---|
| 3,063,342 | 11/1962 | Zeek | 350/632 X |
| 3,609,014 | 9/1971 | Kurz, Jr. | 350/634 |
| 4,094,591 | 6/1978 | Lafont | 350/636 |
| 4,171,873 | 10/1979 | Repay et al. | 248/479 X |
| 4,324,454 | 4/1982 | Kumai | 350/364 |
| 4,482,211 | 11/1984 | Fisher | 350/637 |
| 4,502,759 | 3/1985 | Herzog et al. | 248/487 X |
| 4,512,633 | 4/1985 | Manzoni | 350/632 |
| 4,540,252 | 9/1985 | Hayashi et al. | 350/637 X |

FOREIGN PATENT DOCUMENTS 2558457  7/1977  Fed. Rep. of Germany .

Primary Examiner—John Petrakes
Attorney, Agent, or Firm—Thomas W. Speckman

[57] ABSTRACT

This invention relates to an apparatus providing rapid adjustment of a mirror which is pivotable about a vertical axis and retained in a housing, especially a vehicle rear view mirror, whereby the mirror is operated by an actuator having movement separated from the axis of rotation of the mirror itself and causing the mirror to rotate beyond its preset adjustment position through a preset angle, the mirror retaining contact which the actuator by means of a spring element. Movement of the actuator is controlled by a rotatable operating disk having a peripheral control curve. As the operating disk rotates, it passes through a movement arc which determines the movement of the actuator and the pivot angle of the mirror; this arc is followed by a rest phase arc which determines the final adjustment position of the actuator and the mirror; this arc is followed by a return arc which controls the return of the mirror and the actuator to their initial adjustment positions; the duration, extent and limits of the pivoting movement are all controlled by the configuration of the operating disk.

18 Claims, 4 Drawing Figures

APPARATUS PROVIDING RAPID ADJUSTMENT OF A MIRROR

BACKGROUND OF THE INVENTION

1. Field of the Invention

This invention relates to an apparatus providing rapid adjustment of a mirror which is rotatable about a vertical axis, particularly a vehicle rear view mirror, whereby the mirror is operated by an actuator having movement separated from the axis of rotation of the mirror itself and causing the mirror to rotate through a preset angle, the mirror retaining contact with the actuator by a spring element.

With such an apparatus, it is possible for a vehicle driver to change the angle of view of the mirror for a short period and thus check traffic conditions while passing vehicles or when changing lanes. For this purpose, it is preferable to utilize a mirror of the type where the mirror itself, or an adjustable mirror carrier, can be adjusted to a preset initial position, and is mounted in two supports inside its housing in which the mirror can pivot.

2. Description of the Prior Art

In prior apparatus designed to allow rapid adjustment of a mirror, the mirror may undergo further pivoting movement by direct actuation of a Bowden cable or lever and the angle of view of the mirror may be changed in this way.

With an apparatus of this type, the driver is obliged to monitor the entire range of mirror movement, and the speed with which the mirror pivots through desired angles and with which it returns to its initial position, will depend upon the skill of the individual driver.

It has become desirable for mirror adjustment, particularly vehicle rear view mirror adjustment, to be completed within a specified period, for the mirror to be maintained in its final adjustment position for a specified period, following which the mirror is returned very rapidly to its preset, initial adjustment position.

SUMMARY OF THE INVENTION

An objective of this invention is to provide an apparatus of the type described above which allows adjustment of a mirror through a defined angle of pivot movement by simple means, in which the final adjustment position of the mirror may be maintained for a preset period, after which the mirror is rapidly returned to its initial adjustment position.

This objective is achieved in the present invention, wherein an actuator impinges on an operating disk, the initial adjustment and final adjustment positions of the mirror and actuator are defined at various angular positions on the peripheral control curve of the operating disk, rotary alignment of the operating disk determines the angular position on the control curve which determines the movement of the actuator; a movement arc on the operating disk is followed by a rest phase arc in which the actuator is maintained in its extended position, which is in turn followed by a return phase arc in which the mirror and the actuator are released to return to their initial adjustment positions.

The pivoting motion of the mirror, the duration of its stay at the final adjustment position and the time at which the mirror returns to its initial position are all parameters which can be preset and depend upon the characteristics of the movement arc, the rest phase arc and the return arc of the operating disk. Care must be taken to assure that the operating disk undergoes a controlled rotational movement, which may be brought about by various means. In one embodiment, for example, the movement arc, the rest phase arc and the return arc are distributed over the entire perimeter of the operating disk. All of the mirror movements are performed in a preset sequence during a full rotation of the disk. The duration of each of these movements may be determined and controlled by suitable configuration of the movement arc, the rest phase arc and the return arc as a function of the motion of the operating disk itself.

In another embodiment, means may be provided for distributing a number of functional cycles, each comprising a movement arc, a rest phase arc and a return arc, along the perimeter of the operating disk, whereby the disk effects a full revolution over a correspondingly long period.

In yet a further embodiment, the operating disk may be coupled to a drive shaft by means of a clutch, whereby the operating disk may be driven by the drive shaft in a single, predetermined direction of rotation and the return to its initial position may be accelerated by a spring loaded actuator. With the use of a spring-loaded mechanism, the operating disk may advance relative to the drive shaft, thus allowing it to move through its return arc at very high speed. It is the presence of a coupling device between the operating disk and the drive shaft which makes the advance movement of the operating disk possible. In one embodiment, the coupling between the drive shaft and the operating disk may be arranged so that a drive section on the drive shaft is connected to a drive mechanism on the operating disk by means of a loop spring, which closes in the predetermined direction of rotation and thus provides a frictional link between the drive shaft and the operating disk, whereas in the opposite direction of rotation, the loop spring opens and the operating disk can rotate freely.

In one embodiment, the loop spring and the operating disk supports are arranged so that the loop spring bears on a flange on the drive shaft, whereby a drive shaft journal section of reduced diameter is supported in a communicating bore in the operating disk which is retained with the drive mechanism in the loop spring and on the drive shaft by means of a lock ring mounted on a part of the bearing section of the drive shaft overlapping the communicating bore in the operating disk.

In another embodiment, the actuator directly or indirectly by an actuating element operates an electric switch, which is open when the actuator is in its initial position and which is closed while the actuator is driven through the movement arc, the rest phase arc and the return arc; this electric contact provides a rapid operating signal or brings the drive shaft under the control of an electric motor. In this embodiment, the drive shaft is driven by an electric motor and a reduction gear, and operation of the electric motor itself is controlled by an engaging pulse maintained in the "ON" position for the duration of one operating cycle by means of the electric switch controlled by the actuator or the adjuster.

According to a further embodiment, the speed of rapid adjustment of the mirror may be varied by associating an actuator or two actuators with the mirror, controlled by separate operating disks which are coupled with a common drive shaft by clutches operating in opposite directions to one another, whereby the drive shaft may be rotated in either direction driven by a bidirectional electric motor, whereby movement of the mirror is controlled by one of the two actuators.

Installation of this apparatus may be simplified in one embodiment by providing the actuator, the electric switch, the electric motor and the reduction gear as an integral assembly, and this assembly is installed inside the mirror housing to which it is attached. In a preferred embodiment, the apparatus is arranged so that the mirror is secured to the adjuster unit, which is rotatable in the mirror housing about a vertical axis, whereby the actuator itself bears on a drive pin on the adjuster; this type of mirror may also be provided with an electric fine adjustment of the mirror in its initial adjustment position to enable it to be adjusted by the driver of the vehicle to its initial adjustment position.

BRIEF DESCRIPTION OF THE DRAWINGS

The present invention will be described in greater detail with the aid of illustrations of the following embodiments of the invention.

DESCRIPTION OF THE PREFERRED EMBODIMENTS

Figure 1:
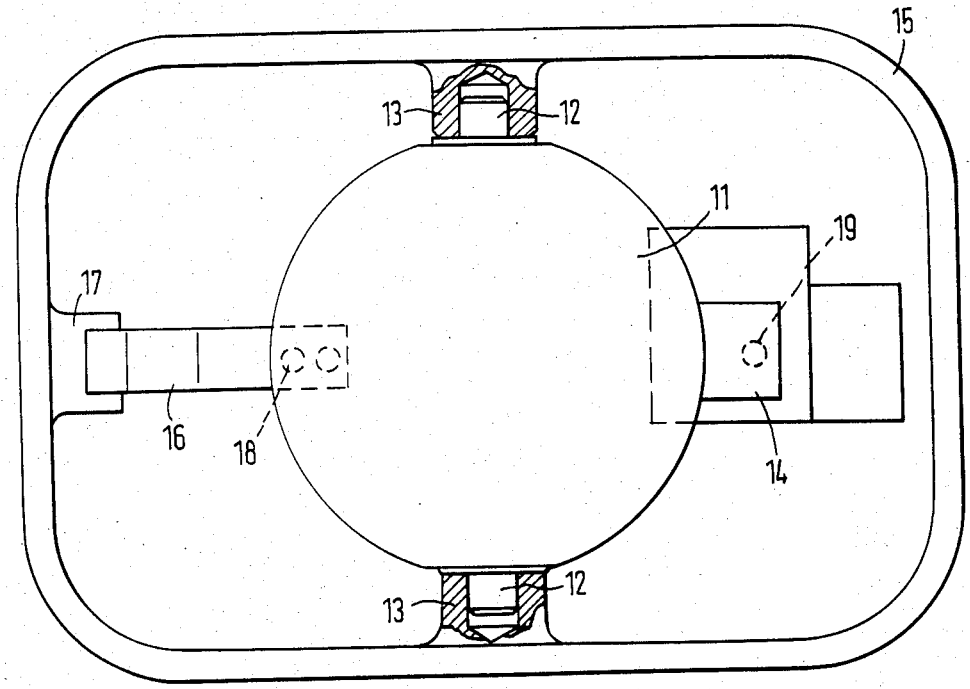
FIG. 1 shows a front view of an adjuster unit inside a mirror housing which pivots about a vertical axis.
Figure 2:
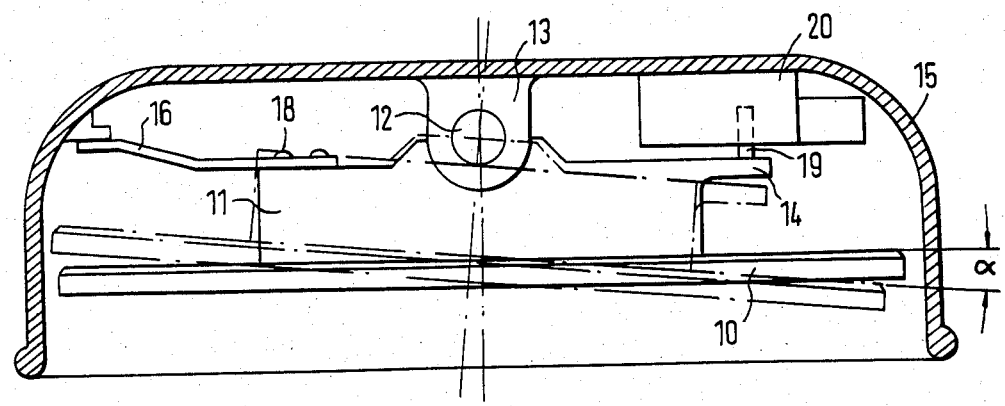
FIG. 2 shows a top, partially cross-sectional view of the adjuster unit shown in FIG. 1, wherein a mirror is mounted on the adjuster unit and is pivotable through an angle $\alpha$.

As shown in FIGS. 1 and 2, adjuster unit 11 is supported in mirror housing 15, and is rotatable about a vertical axis, as indicated by the position of journals 12 of adjuster unit 11 and journal bearings 13 in mirror housing 15.

Mirror 10 is secured to the front of adjuster unit 11, whereby the fastenings of adjuster unit 11 allow precise adjustment of the mirror in an initial adjustment position which can be adapted to meet the driver's requirements. In this arrangement, mirror 10 preferably pivots about both the horizontal and the vertical axes of adjuster unit 11 without changing its position relative to mirror housing 15. The additional pivot bearing of adjuster unit 11 in mirror housing 15 is provided for the rapid adjustment of mirror 10 from its initial adjustment position through an angle $\alpha$. This changes the angle of a view of mirror 10 to overcome the blind angle of the mirror.

It ought to be mentioned that mirrors are known to the art which are not fitted with any adjuster unit 11, and which may also be adjusted in the same way to an initial adjustment position.

In the embodiment illustrated in FIG. 1, spring element 16 is secured to fastening 18 provided on adjuster unit 11, and is supported in mirror housing 15, so that the mirror is maintained in the initial adjustment position shown. Drive pin 14 on adjuster unit 11 is maintained under tension against actuator 19 which forms part of assembly 20 mounted in and fastened to mirror housing 15. It will be evident that the movement of actuator 19 enables adjuster unit 11 and mirror 10 to pivot through an angle $\alpha$. The force of actuator 19 necessary to move the mirror through a specified angle is less as actuator 19 is moved further from the vertical pivot axis of adjuster unit 11.

Figure 3:
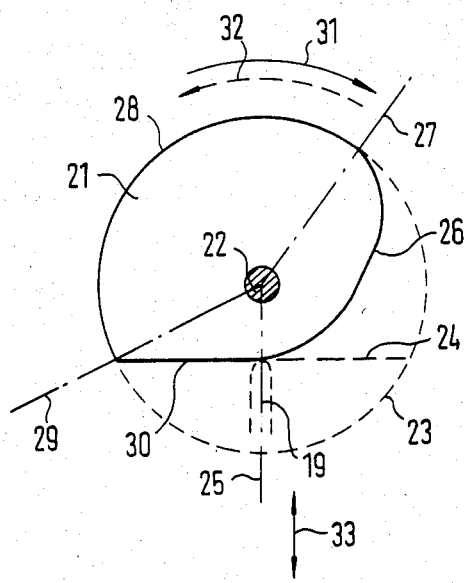
FIG. 3 shows a front view of an operating disk which displaces the actuator.

FIG. 3 shows how the movement of actuator 19 is determined. The axis of rotation of an operating disk 21 is shown as 22. As shown by dashed lines 23 and 24, operating disk 21 may be derived from a circular disk from which a portion has been removed. The shortest possible distance to axis of rotation 22 and the initial adjustment position of actuator 19 may be defined at angular position 25. If operating disk 21 rotates clockwise, in the direction of arrow 31, the initial position of the peripheral control curve of operating disk 21 is followed by movement arc 26 along which the distance to the axis of rotation increases continuously until the maximum distance is reached at angular position 27. During rotation of operating disk 21, movement arc 26 is followed by rest phase arc 28 along which the maximum distance between actuator 19 and the axis of rotation is maintained and thus adjuster unit 11 completes its pivoting motion and maintains its final adjustment position. At angular position 29, rest phase arc 28 is followed by return arc 30 which terminates at angular position 25, at which point actuator 19 is returned to its initial adjustment position. Spring element 16 maintains actuator 19 against adjuster unit 11 so that the actuator continually bears on the control curve of operating disk 21. The actual movement of actuator 19 is indicated by double arrow 33. The degree of movement is a function of the longest and the shortest distance between the control curve of operating disk 21 and axis of rotation 22.

In this example, movement arc 26, rest phase arc 28 and return arc 30 extend along the entire perimeter of the operating disk. The length of the adjustment cycle, of the resting phase at the final adjustment position, and the return arc, will thus be determined by the duration of one revolution of operating disk 21. By suitably locating angular positions 25, 27 and 29, the configuration of movement arc 26, rest phase arc 28 and return arc 30 can be varied within this cycle. It is also possible to arrange a number of separate cycles comprising movement, rest and return arcs successively along the perimeter of a single operating disk 21.

A preferred means of driving operating disk 21 is an electric motor with a downstream reduction gear, driven by the vehicle's power system. The electric motor may be switched on by actuation of the vehicle's directional indicator, so that as soon as the indicator is positioned to indicate a left turn, a signal is provided to the motor. Electric switch 42 ensures that the electric motor remains in operation for the duration of an entire cycle of operating disk 21. Switch 42 closes as soon as operating disk 21 leaves its initial position and it opens again only when operating disk 21 has reached the end of one operating cycle. This switch thus controls the electric motor for the duration of one operating cycle. The electric motor, the reduction gear, switch 42 and actuator 19 may be provided in assembly 20, mounted in mirror housing 15 and attached in such a way that actuator 19 bears on drive pin 14 of adjuster unit 11, thus determining the initial position of the adjuster unit.

Figure 4:
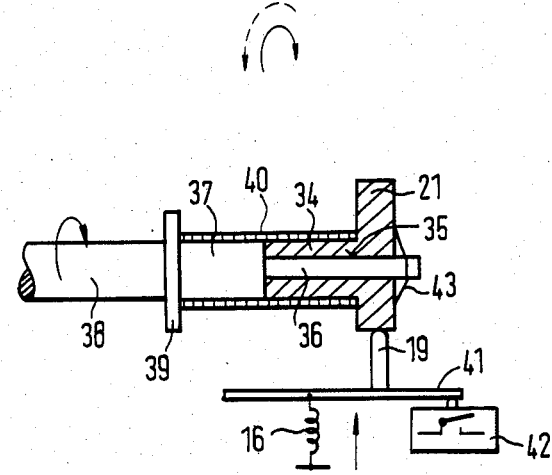
FIG. 4 shows a side view, partially in cross section, of a coupling between the drive shaft and the operating disk.

As shown in FIG. 4, drive shaft 38, which extends from the reduction gear, is not rigidly connected to operating disk 21. At the end of drive shaft 38, flange 39 separates driving section 37 on which loop spring 40 is fitted to act as a monodirectional clutch. Operating disk 21 is provided with drive pin 34 which is also in contact with loop spring 40. A journal section of reduced diameter 36 of drive shaft 38 passes through bore 35 of operating disk 21. Lock ring 43 is mounted on the end of journal section 36 which projects from bore 35; this ring positively secures operating disk 21 on drive shaft 38 and also ensures that loop spring 40 is retained on drive section 37 of drive shaft 38 as well as on drive pin 34 of operating disk 21.

Loop spring 40 is continuous in the direction of rotation 31 so that it is tensioned against drive section 37 and drive pin 34, and thus provides a frictional link between drive shaft 38 and operating disk 21. Operating disk 21 rotates with drive shaft 38 and displaces actuator unit 19 as a function of its peripheral control curve. In the opposite direction of rotation 32, loop spring 40 opens. The frictional link is broken and thus operating disk 21 no longer rotates with drive shaft 38. This monodirectional clutch between drive shaft 38 and operating disk 21 has a further function, since rotation of operating disk 21 may be advanced in direction 31 with respect to drive shaft 38. This feature may be used to accelerate the return of actuator 19 to its initial position when angular position 29 is reached. As soon as actuator 19 passes beyond angular position 29 and contacts return arc 30, the spring loading impinging on actuator 19 causes operating disk 21 to rotate in direction 31 until it reaches angular position 25, and actuator 19 is returned to its initial position. The sector between angular positions 29 and 25 on the operating disk 21 is very rapidly covered, independently of the constant rate of rotation of drive shaft 38 in direction 31; in fact this sector will be covered in a fraction of the time it takes for drive shaft 38 to cover the same distance. The duration of this return travel is a function of the spring loading of actuator 19 and also of the mechanical inertia of the system comprising adjuster unit 11, mirror 10, actuator 19, operating disk 21 and switch 42.

It is also possible to control the operation of adjuster unit 11 or of mirror 10 with two actuators 19 which may be driven by two different operating disks 21. In this case, two operating disks 21 are coupled to drive shaft 38 with two loop springs 40, each of which provides a frictional link between the operating disk and the drive shaft in opposite directions of rotation. If a reversible electric motor is used, rapid adjustment may be effected by either of the two operating disks, as desired.

Loop spring 40 may be replaced by another simple monodirectional device, if required, such as a free-wheel roller, free-wheel link, ratchet, etc.

Assembly 20 and actuator 19 may also be incorporated in adjuster unit 11. In this case, actuator 19 is supported in mirror housing 15.

I claim:

1. An apparatus providing rapid adjustment of a mirror which is pivotable about a vertical axis and disposed in a mirror housing, wherein said mirror is adjustable from an initial adjustment position by a preset pivot angle to a final adjustment position and automatically returnable to said initial adjustment position, said apparatus comprising: a mirror housing (15) having journal bearings (13) aligned on a vertical axis; an adjuster unit (11) having journals (12) aligned on said vertical axis and mounted in said journal bearings (13); a mirror mounted on said adjuster unit (11); a spring means (16) in force relation between said mirror housing (15) and a first side of said adjuster unit (11) displaced from said vertical axis; an actuator means (19) of said adjuster unit (11) at a second side of said adjuster unit displaced from said vertical axis opposite to said first side; a rotatable operating disk (21) having a contoured peripheral control curve and a drive pin (34) extending therefrom, said actuator means (19) maintained in contact with said contoured peripheral control curve by said force of said spring means (16); said contoured peripheral control curve defining a cycle comprising an angular initial position (25), a movement arc (26), a final adjustment position (27), a rest phase arc (28), and a return arc (30); a drive shaft (38) with a drive section (37) extending therefrom and means for rotating said drive shaft in a direction of rotation (31), said drive shaft (38) coupled to said operating disk (21) by a clutch means coupling said drive section (37) to said drive pin (34), said clutch means providing a monodirectional link between said drive shaft (38) and said operating disk (21) in said direction of rotation (31) whereby said operating disk (21) is rotatable in said direction of rotation (31), causing said actuator means (19) to sequentially contact said movement arc (26), said rest phase arc (28) and said return arc (30) comprising one said cycle of said peripheral control curve and thereby providing adjustment of said mirror from said initial adjustment position through said preset pivot angle to a final adjustment position and back to said initial adjustment position.

2. An apparatus according to claim 1, wherein said movement arc (26), said rest phase arc (28) and said return arc (30) extend along the entire perimeter of said operating disk (21).

3. An apparatus according to claim 1, wherein several cycles, each comprising one said movement arc (26), one said rest phase arc (28) and one said return arc (30) are distributed over the perimeter of said operating disk (21).

4. An apparatus according to claim 1, wherein said clutch means comprises a loop spring (40) coupling said drive section (37) to said drive pin (34) on said operating disk (21), said loop spring (40) establishes a frictional link between said drive shaft (38) and said operating disk (21) in said direction of rotation (31), and in the opposite direction of rotation, said loop spring (40) opens to break said frictional link.

5. An apparatus according to claim 4, wherein a flange (39) is provided on said drive shaft (38) from which said drive section (37) extends and a journal section of reduced diameter (36) extends from said drive section (37); said operating disk (21) has a bore (35) through which a terminal end of said journal section of reduced diameter (36) projects; and a lock ring (43) is mounted on said terminal end of said journal section (36) to positively secure said operating disk (21) to said drive shaft (38) and to positively retain said loop spring (40).

6. An apparatus according to claim 5, wherein an electric switch (42) is provided in electrical contact with said means for rotating said drive shaft (38) and in contact with said actuator (19), said switch opening when said actuator (19) is at said initial adjustment position, and said switch closing and remaining closed when said operating disk (21) rotates through said movement arc (26), said rest phase arc (28) and said return arc (30).

7. An apparatus according to claim 6, wherein said means for rotating said drive shaft (38) comprises an electric motor coupled to a reduction gear, and the operation of said electric motor is controlled by said electric switch (42).

8. An apparatus according to claim 7, wherein said adjuster unit (11) is provided with a second actuator means (19) at said second side of said adjuster unit and said drive shaft (38) is coupled by a second opposite monodirectional clutch means to a second operating disk (21), said monodirectional clutches operating in opposite directions and said drive shaft (38) rotatable in opposite directions by a bidirectional electric motor, whereby the adjustment of said mirror (10) is controlled by one of said actuators upon rotation of said drive shaft (38) in one direction and the second of said actuators upon rotation of said drive shaft (38) in the opposite direction.

9. An apparatus according to claim 7, wherein a drive pin (14) is provided as an extension of said adjuster unit (11) and said actuator means (19) is maintained in contact with said drive pin (14).

10. An apparatus according to claim 9, wherein an integrated assembly (20) is formed by mounting said actuator means (19), said electric switch (42), said electric motor and said reduction gear together and said assembly (20) is attached to the inside of said mirror housing (15).

11. An apparatus according to claim 9, wherein an integrated assembly (20) is formed by mounting said actuator means (19), said electric switch (42), said electric motor and said reduction gear together and said assembly (20) is incorporated in said adjuster unit (11).

12. An apparatus according to claim 7, wherein an integrated assembly (20) is formed by mounting said actuator means (19), said electric switch (42), said electric motor and said reduction gear together and said assembly (20) is attached to the inside of said mirror housing (15).

13. An apparatus according to claim 5, wherein an electric switch (42) is provided in electrical contact with said means for rotating said drive shaft (38) and an actuating element (41) is provided on said actuator means (19) in contact with said switch (42), said switch opening when said actuator means (19) is at said initial adjustment position and said switch closing and remaining closed during rotation of said operating disk (21).

14. An apparatus according to claim 13, wherein said means for rotating said drive shaft (38) comprises an electric motor coupled to a reduction gear, and continuous operation of said electric motor is maintained throughout the duration of a single said cycle of said operating disk (21) by said actuating element (41) contacting said switch (42).

15. An apparatus according to claim 1, wherein a flange (39) is provided on said drive shaft (38) from which said drive section (37) extends and a journal section of reduced diameter (36) extends from said drive section (37); said operating disk (21) has a bore (35) through which a terminal end of said journal section of reduced diameter (36) projects; and a lock ring (43) is mounted on said terminal end of said journal section (36) to positively secure said operating disk (21) to said drive shaft (38).

16. An apparatus according to claim 1, wherein an electric switch (42) is provided in electrical contact with said means for rotating said drive shaft (38) and in contact with said actuator means (19), said switch opening when said actuator means (19) is at said initial adjustment position, and said switch closing and remaining closed when said operating disk (21) rotates through said movement arc (26), said rest phase arc (28) and said return arc (30).

17. An apparatus according to claim 1, wherein said adjuster unit (11) is provided with a second actuator means (19) at said second side of said adjuster unit and said drive shaft (38) is coupled by a second opposite monodirectional clutch means to a second operating disk (21), said monodirectional clutches operating in opposite directions and said drive shaft (38) rotatable in opposite directions by a bidirectional electric motor, whereby the adjustment of said mirror (10) is controlled by one of said actuators upon rotation of said drive shaft (38) in one direction and the second of said actuators upon rotation of said drive shaft (38) in the opposite direction.

18. An apparatus according to claim 1, wherein a drive pin (14) is provided as an extension of said adjuster unit (11) and said one end of said actuator means (19) is maintained in contact with said drive pin (14).

* * * * *